United States Patent
Wegenkittl et al.

(10) Patent No.: US 8,793,301 B2
(45) Date of Patent: Jul. 29, 2014

(54) METHOD AND SYSTEM FOR DYNAMIC IMAGE PROCESSING

(75) Inventors: Rainer Wegenkittl, Sankt Poelten (AT); Donald K. Dennison, Waterloo (CA); John J. Potwarka, Waterloo (CA); Lukas Mroz, Vienna (AT); Armin Kanitsar, Vienna (AT); Gunter Zeilinger, Vienna (AT)

(73) Assignee: AGFA Healthcare, Mortsel (BE)

( * ) Notice: Subject to any disclaimer, the term of this patent is extended or adjusted under 35 U.S.C. 154(b) by 310 days.

(21) Appl. No.: 11/944,220

(22) Filed: Nov. 21, 2007

(65) Prior Publication Data

US 2009/0138544 A1   May 28, 2009

Related U.S. Application Data

(60) Provisional application No. 60/867,055, filed on Nov. 22, 2006.

(51) Int. Cl.
*G06F 15/16* (2006.01)
*G06F 9/50* (2006.01)
*G06T 1/20* (2006.01)

(52) U.S. Cl.
CPC ............... *G06T 1/20* (2013.01); *G06T 2200/16* (2013.01); *G06F 9/5083* (2013.01)
USPC ............................ 709/201; 709/202; 709/203

(58) Field of Classification Search
USPC .................................. 709/201–203, 219, 246
See application file for complete search history.

(56) References Cited

U.S. PATENT DOCUMENTS

| | | | |
|---|---|---|---|
| 6,167,442 A * | 12/2000 | Sutherland et al. | 709/217 |
| 6,377,257 B1 * | 4/2002 | Borrel et al. | 345/419 |
| 6,384,821 B1 * | 5/2002 | Borrel et al. | 345/421 |
| 6,438,576 B1 * | 8/2002 | Huang et al. | 709/202 |
| 6,704,798 B1 * | 3/2004 | Mogul | 709/246 |
| 6,725,421 B1 * | 4/2004 | Boucher et al. | 715/205 |

(Continued)

FOREIGN PATENT DOCUMENTS

| | | | |
|---|---|---|---|
| EP | 1 241 575 A2 | 9/2002 | |
| JP | 2004-265151 | * 9/2004 | G06F 3/12 |

OTHER PUBLICATIONS

Grimstead, I., et al., "Automatic Distribution of Rendering Workloads in a Grid Enabled Collaborative Visualization Environment", School of Computer Science, Cardiff University, Nov. 2004.*

(Continued)

*Primary Examiner* — Emmanuel L Moise
*Assistant Examiner* — Sarah Drabik
(74) *Attorney, Agent, or Firm* — Lewis, Rice & Fingersh, L.C.

(57) ABSTRACT

A method of processing an image wherein one or more processing functions are executed. Firstly, the steps involved in the one or more processing functions are determined where each of the one or more processing functions can include one or more processing steps. Secondly, the resource requirements associated with each of the processing functions are determined. The resource availability for the one or more resource requirements on a client is determined. Thirdly, and finally, each of the one or more processing functions are selectively allocated to the at least one of the client and the server in the case where the client does not have the required resource availability.

12 Claims, 5 Drawing Sheets

(56) References Cited

U.S. PATENT DOCUMENTS

| | | | |
|---|---|---|---|
| 6,867,779 B1* | 3/2005 | Doyle et al. | 345/502 |
| 7,016,061 B1* | 3/2006 | Hewitt | 358/1.15 |
| 7,062,527 B1* | 6/2006 | Tyrrell, III | 709/201 |
| 7,092,983 B1* | 8/2006 | Tyrrell, III | 709/201 |
| 7,339,687 B2* | 3/2008 | Ferlitsch | 358/1.13 |
| 7,372,465 B1* | 5/2008 | Tamasi et al. | 345/502 |
| 7,372,485 B1* | 5/2008 | Bodnar et al. | 348/234 |
| 7,415,524 B2* | 8/2008 | Burd et al. | 709/229 |
| 7,483,939 B2* | 1/2009 | Mussack et al. | 709/201 |
| 7,698,417 B2* | 4/2010 | Rizzi et al. | 709/224 |
| 7,706,017 B2* | 4/2010 | Ferlitsch | 358/1.5 |
| 7,783,695 B1* | 8/2010 | Tyrrell et al. | 709/201 |
| 7,843,586 B2* | 11/2010 | Ferlitsch | 358/1.15 |
| 7,890,573 B2* | 2/2011 | Turner et al. | 709/203 |
| 8,046,494 B2* | 10/2011 | Levenberg | 709/246 |
| 8,134,743 B2* | 3/2012 | Rai | 358/1.9 |
| 2002/0129097 A1* | 9/2002 | Jia | 709/203 |
| 2002/0169823 A1* | 11/2002 | Coulombe et al. | 709/203 |
| 2003/0158886 A1* | 8/2003 | Walls et al. | 709/201 |
| 2005/0001024 A1* | 1/2005 | Kusaka et al. | 235/375 |
| 2005/0273527 A1 | 12/2005 | Olstad et al. | |
| 2006/0018628 A1* | 1/2006 | Mizuno et al. | 386/46 |
| 2006/0028479 A1* | 2/2006 | Chun et al. | 345/531 |
| 2006/0082583 A1* | 4/2006 | Leichtling et al. | 345/522 |
| 2006/0122834 A1* | 6/2006 | Bennett | 704/256 |
| 2007/0147686 A1* | 6/2007 | Joshi | 382/232 |
| 2007/0214235 A1* | 9/2007 | Woods et al. | 709/217 |
| 2008/0043015 A1* | 2/2008 | Valdiserri et al. | 345/419 |

OTHER PUBLICATIONS

Wu et al., "A Distributed Real-time Image Processing System", 1995, retrieved from <http://www.sciencedirect.com/science/article/pii/S1077201485710443>.*

Messer, A., et al., "Towards a Distributed Platform for Resource-Constrained Devices," Proceedings of the 22nd International Conference on Distributed Computing Systems (ICDCS'02), Feb. 2002, 9 pages.

Grimstead, I., et al., "Automatic Distribution of Rendering Workloads in a Grid Enabled Collaborative Visualization Environment," School of Computer Science, Cardiff University, SC2004, Nov. 2004, 9 pages.

Hesina, G., et al., "A Network Architecture for Remote Rendering," Vienna University of Technology, Austria, Apr. 1998, 4 pages.

Chen, J., et al., "A Reconfigurable Architecture for Load-Balanced Rendering," MIT/Nokia Research Centre, Graphics Hardware, The Eurographics Association, Jul. 2005, 11 pages.

Schmalstieg, D., et al., "Demand-Driven Geometry Transmission for Distributed Virtual Environments," Institute of Computer Graphics, Vienna University of Technology, Austria, Aug. 1996, 12 pages.

Engel, K., et al., "Client-Server-Strategien zur Visualisierung komplexer Struktureigenschaften in digitalen Dokumenten der Chemie," Informationstechnik and Technische, 42, Jun. 2000, pp. 17-23.

International Search Report, International Application No. PCT/EP2007/062116, mailed on Mar. 10, 2008, 9 pages.

* cited by examiner

METHOD AND SYSTEM FOR DYNAMIC IMAGE PROCESSING

CROSS REFERENCE TO RELATED APPLICATION(S)

This application claims benefit of and priority to U.S. Provisional Application Ser. No. 60/867,055, filed Nov. 22, 2006. The entire disclosure of which is herein incorporated by reference.

BACKGROUND

1. Field of the Invention

The embodiments described herein relate generally to image processing methods and systems and, more specifically, to an improved method and system for performing image processing functions in client-server environments.

2. Description of the Related Art

Image processing functions in medical imaging applications are generally carried out on image data by a client device that has accessed an image server to retrieve stored image data. These image processing functions, when completed, cause the related medical images to be displayed on the client device. A medical practitioner is then able to analyze the medical images displayed on the client device.

Increasingly, health professionals are using a wider array of client devices to access medical image data stored on image servers for reasons including facilitating user mobility. While computing workstations are still in common use, increasing use is being made of handheld computers, personal digital assistants and other such devices to access and view medical images. The processing functions that are associated with the rendering and display of a requested medical image often entail intensive processing (i.e. computing overhead). Therefore, the processing functions are often executed at the image server as the client devices are not suited to perform such processing. The resultant image data is passed from the image server to the client device for display.

However, processing such functions at the image server does not take into consideration existing processing demands already placed on the image server. Accordingly, the computing resources on the image server that are available to conduct image processing functions for any particular client device are limited by overall traffic patterns and usage demands placed on the image server.

SUMMARY

The embodiments described herein provide in one aspect a method of processing an image wherein one or more processing functions are executed, the method comprising: (a) determining the steps involved in the one or more processing functions wherein each of the one or more processing functions may comprise one or more processing steps; (b) determining one or more resource requirements associated with each of the one or more processing functions; (c) determining a resource availability for the one or more resource requirements upon a client; and (d) selectively allocating each of the one or more processing functions to at least one of the client and the server where the client does not have the required resource availability.

The embodiments described herein provide in another aspect a method of distributed processing of an image wherein one or more processing functions are executed, the method comprising: (a) executing one or more processing steps associated with the one or more processing functions at a client if the one or more processing steps can be executed at the client; (b) providing client output data based on the executed one or more processing steps to a server for execution if the one or more processing steps can not be executed at the client, based on not meeting the one or more resource requirements associated with the one or more processing steps; and (c) receiving server output data, based on the server executed one or more processing steps for the execution at the client of the remaining one or more processing steps.

The embodiments described herein provide in another aspect a system for processing an image wherein one or more processing functions are executed, the system comprising: (a) a memory for storing a plurality of instructions; and (b) a processor coupled to the memory, said processor configured for: (i) determining the steps involved in the one or more processing functions wherein each of the one or more processing functions may comprise one or more processing steps; (ii) determining one or more resource requirements associated with each of the one or more processing functions; (ii) determining a resource availability for the one or more resource requirements upon a client; and (iv) selectively allocating each of the one or more processing functions to at least one of the client and the server where the client does not have the required resource availability.

The embodiments described herein provide in another aspect a system for distributed processing of an image wherein one or more processing functions are executed, the system comprising: (a) a memory for storing a plurality of instructions; and (b) a processor coupled to the memory, said processor configured for: (i) executing one or more processing steps associated with the one or more processing functions at a client if the one or more processing steps can be executed at the client; (ii) providing client output data, based on the executed one or more processing steps to a server for execution if the one or more processing steps can not be executed at the client, based on not meeting the one or more resource requirements associated with the one or more processing steps; and (iii) receiving server output data, based on the server executed one or more processing steps for the execution at the client of the remaining one or more processing steps.

Further aspects and advantages of the embodiments described will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment and in which.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The embodiments of the systems and methods described herein may be implemented in hardware or software, or a combination of both. However, preferably, these embodiments are implemented in computer programs executing on programmable computers, each comprising at least one processor, a data storage system (including volatile and non-volatile memory and/or storage elements), at least one input device, and at least one output device. For example, and without limitation, the programmable computers may be a mainframe computer, server, personal computer, laptop, personal data assistant, or cellular telephone. Program code is applied to input data to perform the functions described herein and generate output information. The output information is applied to one or more output devices in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer-usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer-usable instructions may also be in various forms, including compiled and non-compiled code.

Figure 1:
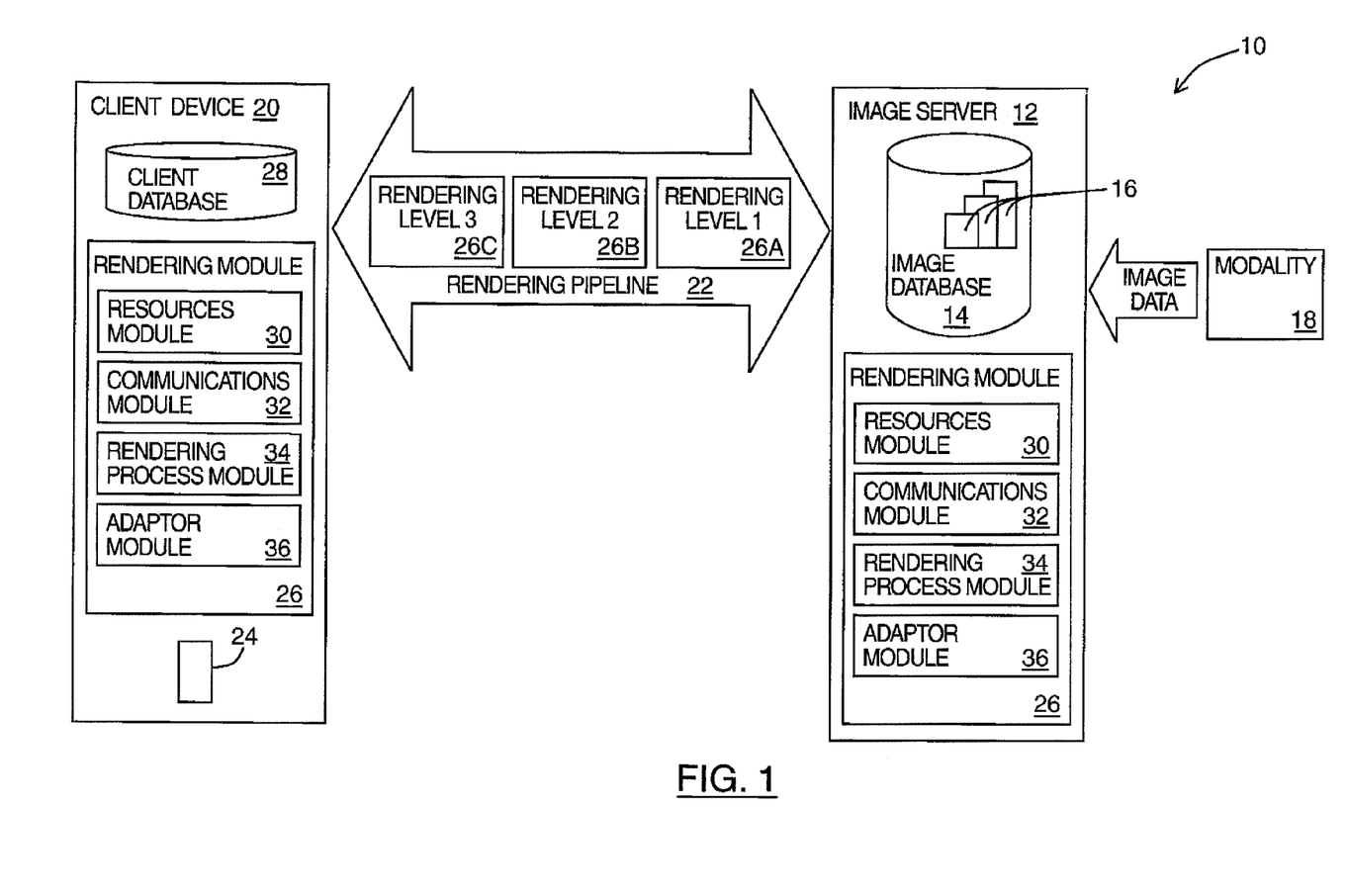
FIG. 1 is a block diagram of an exemplary embodiment of an image processing system.

Reference is now made to FIG. 1 which illustrates elements of an exemplary embodiment of an image processing system 10. The image processing system 10 includes an image server 12, an image database 14 containing one or more medical image data files 16, one or more imaging modalities 18 and one or more client devices 20.

The image processing system 10 coordinates and distributes image processing functions between the client devices 20 and the image server 12. As described below, when image rendering is required, the image processing system 10 provides for a dynamic allocation of the image processing functions between the image server 12 and the client devices 20. The processing functions associated with the display of the image upon the client devices 20 may be carried out in various parts or stages where the respective parts or stages of the processing function are carried out at both the image server 12 and at the client devices 20. Each image that is displayed at a client device 20 has associated with it one or more image processing functions that are carried out in a rendering pipeline 22. The rendering pipeline 22 is used to describe the rendering functions that are associated with a requested operation upon a medical image. The requested operations may include any requests made by the user or system associated with a medical image including, but not limited to, a request to display an image, to performing various transformations/manipulations and other such operations. The resultant image that is displayed is referred to as the displayed image 24.

The image processing system 10 ensures that the respective processes that are utilized to display the medical image 24 at the client device 20 are performed in an efficient manner taking into consideration the processing requirements, and the processing resources available at the image server 12 and at the respective client devices 20.

As further discussed in more detail, it should be understood that the image processing system 10 may be implemented in hardware or software or a combination of both. Specifically, the modules of the image processing system 10 are preferably implemented in computer programs executing on programmable computers, each comprising at least one processor, a data storage system and at least one input and at least one output device. Without limitation, the programmable computers may be a mainframe computer, server, personal computer, laptop, personal data assistant or cellular telephone. In an exemplary implementation, the image processing system 10 is implemented in software and installed on the hard drive of client device 20 and on the image server 12 such that the client devices 20 interoperates with image server 12 in a client-server configuration.

The image server 12 stores medical images files 16 in the image database 14. The image processing system 10 is being described herein with respect to one image server 12, however, it will be understood that more than one image server 12 may be employed in the system 10.

The image server 12 in an exemplary embodiment receives medical image data (e.g. bitmaps, JPEGS, GIFs, DICOM format images, etc.) from the imaging modality 18 where the medical image data is stored as a medical image file 16. The imaging modality 18 generates the medical image data based on various procedures that may be performed on patients and provides the medical image data that forms the medical image to the image server 12. The image server 12 is connected through a communication network by wired or wireless methods to the client devices 20. The client devices 20 connect to the image server 12 through a communication network and access the medical images files 16 that are stored upon the image database 14.

The image database 14 stores the medical image data that is converted into medical image files 16. The image database 14 also stores associated identification information with respect to each medical image file 16. For example, medical images files 16 may have associated with them identification information that includes, but is not limited to, patient identifiers, patient names and other descriptions regarding the patient, image, or study from which the medical images files 16 were generated. In an exemplary embodiment, the modality 18 provides the image server 12 with medical images in a standard DICOM format (a single file containing the pixel data) and image attributes (e.g. patient name, image rows and columns, etc.). The image server 12 may choose to (re)compress the images before storing to an image cache (not shown). The image server 12, in addition, will copy some or all of the image attributes to the database 14 for quick retrieval by the client devices 20.

The imaging modality 18 generates medical image data in either an analog or digital format from which the medical image files 16 are created. The imaging modality 18 may include any device that is used to capture any type of image of a patient.

Each client device 20 may be any computing device that is able to connect to the image server 12. Examples of client devices 20 include, but are not limited to, personal computers, laptop computers, slim line computers, server based computers, handheld computers, and any other such device that is able to provide an interface and connect to the image server 12 through a communication network. Each client device 20 has an output device (not shown) such as a monitor or screen associated with it for viewing of the displayed medical image 24 and for engaging with the displayed image 24. The user may perform manipulations, transformations and other such interactions upon such images.

When an operation is requested in association with a medical image file 16, or a displayed medical image 24, various processing functions are undertaken (depending on the request and the medical image) to ensure the requested operations are performed in an efficient manner. The various processing functions are undertaken in what is referred to as a rendering pipeline 22.

The rendering pipeline 22 comprises the respective processing functions that are required to execute the requested operation. The rendering of an image includes all of the steps from accessing the image data file 16 and the data associated with such a file to performing all of the various processing steps that are required in order to display the image as desired by the user or system 10. Requested operations may include various operations including displaying an image, superimposing an image, displaying images side by side and performing various interactions on these displayed images. Some of the requested operations may involve the use of multiple pipelines 22. For example, when displaying images side by side, this would involve multiple rendering pipelines 22 (one pipeline 22 for each image). The term "displayed images" 24 is used to refer herein to an image at a client device 20 and may include one or more associated medical image files 16 that have been used to generate the displayed image 24.

The rendering pipeline 22 is used to describe all of the respective processing functions that are carried out in order to give effect to the requested operation. The steps of the rendering process are divided up for purposes of this description into what are referred to respectively as rendering levels 26. Each rendering level may have associated with it one or more rendering steps that are performed upon the underlying data for various purposes (i.e., edge detection, filtering). For purposes of this description, the various rendering levels are categorized into one of three rendering levels. These three rendering levels are referred to in this description, respectively, as a first rendering level 26A, a second rendering level 26B, and a third rendering level 26C. The respective rendering levels, as described herein, are described for purposes of example only as the rendering process may be divided into numerous rendering levels. In an exemplary embodiment, the first rendering level is used to access data, the second rendering level processes the data and the third rendering level displays the data.

The respective rendering levels 26 work together in order to render an image as per the requested operation. For example, the first rendering level 26A provides various processing functions and provides the output of those processing functions to the second rendering level 26B. The second rendering level 26B performs various rendering functions and provides input to the third rendering level 26C. The third rendering level 26C performs the final rendering steps and renders the image such that a displayed medical image 24 is provided to the output device.

The various rendering levels 26 and the various processing steps that may be carried out at the various levels are described herein with respect to exemplary embodiments. Based on the requested operation, the rendering pipeline 22 executes various rendering steps.

In an exemplary embodiment, the first rendering level 26A executes the algorithm that is required to display the image. As an example, the first rendering level 26A may execute the underlying algorithm that may include, for example, the underlying transformation, manipulation or generation. The second rendering level 26B then receives the results of the execution of the first rendering level 26A and will then perform one or more processing steps upon the input provided by the first rendering level 26A. As an example, the second rendering level 26B may then perform any one of the following steps: filtering, bit representation conversions, and fusion.

In an exemplary embodiment, the output of the second rendering level 26B is then provided to the third rendering level 26C. At the third rendering level, steps are undertaken to perform any processing steps that are required to display the image at the client device 20. In an exemplary embodiment, as described below, the respective rendering levels 26 associated with a rendering pipeline may be implemented on either the image server 12 or the respective client device 20. Also, the steps associated with each rendering level may themselves be performed on a combination of the image server 12 or on the respective client device 20. It should be noted that not all rendering levels need to be executed when processing an image as some rendering levels may contain steps that do not require execution, based on the operation that has been requested for an image. In an alternative embodiment, each non-first rendering level may receive input from multiple lower level renderers, where the non-first rendering level may act as a multiplexer. Functioning as a multiplexer allows multiple processes to be executed when one higher level rendering level is required to process the inputs of multiple lower level renderers, as they may be processed sequentially.

Each of the client devices 20 that are part of the image processing system 10 include, or have associated with them, a rendering module 26, and a client storage device or database 28. The rendering module 26 in an exemplary embodiment, is comprised of a resources module 30, a communications module 32, a rendering process module 34 and an adaptor module 36.

The resources module 30 in an exemplary embodiment, determines the required processing resources for each rendering step that is carried out in the rendering process. The term "resources", as used herein, is used to refer to any hardware or software resources that are found upon an image server 12 or a client device 20 that may be used in the execution of respective rendering steps, as described below. The term "processing requirements" is used to refer to specific requirements that the rendering process has in order to effectively and efficiently perform a rendering step. Required processing resources may include, but are not limited to, any memory capabilities, processing capabilities and graphics capabilities.

The required processing resources are determined, based on an analysis of the underlying medical data and the specific processing function. As an example and as further described below, the request to perform a certain processing function on certain data may have associated with it certain required processing requirements (i.e. a certain processor speed is required and/or a certain amount of memory must be available). The required processing resources are differentiated from the preferred processing resources. The preferred processing resources are resources that allow for a more efficient execution of a rendering step but are not absolute requirements. The resources module 30 determines the required and preferred processing resources for each rendering step that is to be undertaken. In an exemplary embodiment, the determination is made prior to the execution of the rendering process for each level.

The communications module 32, based on the processing requirements, will poll the respective processing resources on both the client 20 and the server 12 to determine the actual availability of the respective processing resources. As an example, the communications module 32 may determine the memory availability, the processing speeds available and whether any required hardware components are available on the server 12 or the client 20.

The rendering process module 34 is used to determine where the respective processing functions are to be performed, based on the input provided by the resources module 30 and the communication module 32. The determination made by the rendering process module 34 is explained in further detail below with respect to FIG. 5.

The adaptor module 36 is used to facilitate the distributed processing within the system 10. Specifically, as is described in further detail below, the adaptor module 36 provides for the exchange of data between the server 12 and client devices 20 where the next processing step is to be performed at a different location than the previous one (i.e. image server 12 to client 20 or client 20 to image server 12). The adaptor module 34 has associated with it one or more adaptors, the operation of which is described in further detail below.

Figure 2:
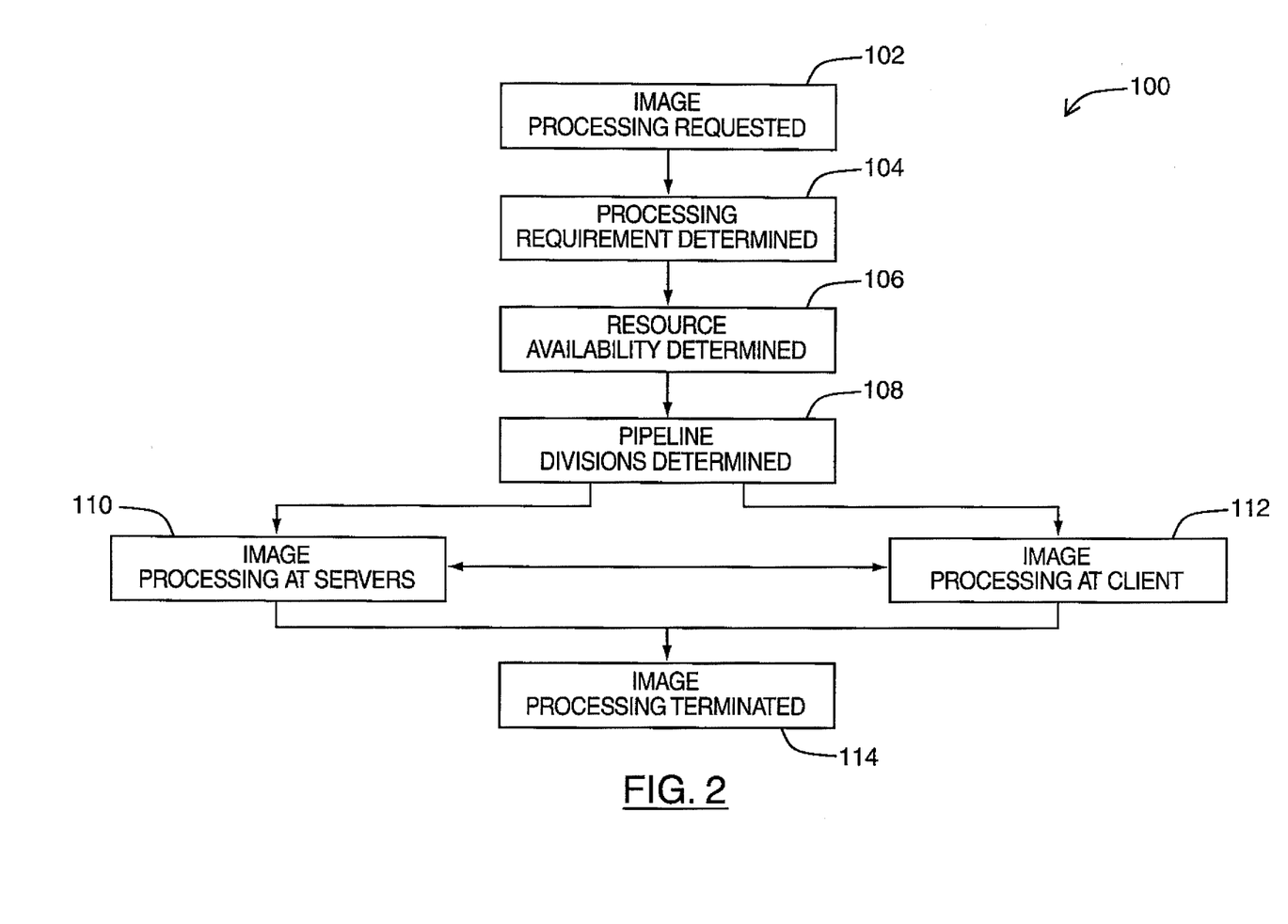
FIG. 2 is a flowchart diagram illustrating the basic operational steps executed by the image processing system of FIG. 1.

Reference is now made to FIG. 2, where a flowchart diagram illustrates the basic operational steps 100 of the processing system 10. Operational steps 100 begin at step (102), where a user may request an operation to be performed. The requested operation may be an operation requested by the user or by the logic associated with the client device 20 or server 12 without any user input.

At step (104), the processing requirements are determined. The processing requirements are determined, based on the requested operation and the data upon which the requested operation is to be performed. The processing requirements, as mentioned above, include both required processing requirements and preferred processing requirements which enhance the processing of the requested operation. The processing requirements also may include determining the capabilities of the GPU (graphics card unit). For example, if the GPU supports OpenGL or volume rendering directly in hardware, this will aid in determining which rendering processes are used and where they are implemented.

At step (106) the availability of resources is determined. The resource availability is determined, based on the processing requirements determined at step (104). The determination as to the availability of the resources allows for a subsequent determination to be made regarding the most efficient manner by which the processing functions associated with the requesting operation may be carried out on either server 12 or client 20 or a combination of both.

At step (108), the distribution of the various image processing functions (rendering steps) are determined. At step (108), as is explained in further detail below, it may be determined that any number of the associated processing steps may be carried out at the image server 12, and any number of the associated processing steps may be carried out at the client 20 or any combination of the two. The determination at step (108) is performed before the execution of the respective rendering process (i.e. determination as to where the first rendering level will execute and where the second rendering level will execute etc.).

At steps (110) and (112), the respective processing steps that have been specified to take place at the respective image server 12 and the client devices 20 are executed. As the processing steps are generally carried out in a sequential manner, when a determination has been made for the subsequent sequential processing step to be carried out on the client side where the current step is being carried out at the image server side 12, the adaptors will provide the data upon which the processing is to continue to the image server 12 at step (110). Similarly, where the current step is being carried out at the image server side 12 and the subsequent sequential steps are to be carried out at the client side 20, upon the conclusion of the current processing step, the adaptors provide the data upon which the processing is to continue to the client 20 at step (112).

At the conclusion of steps (110) and (112) with regards to all of the processing steps that are associated with a requested operation, at step (114) the processing steps have been completed and the requested operation has been performed.

Figure 3:
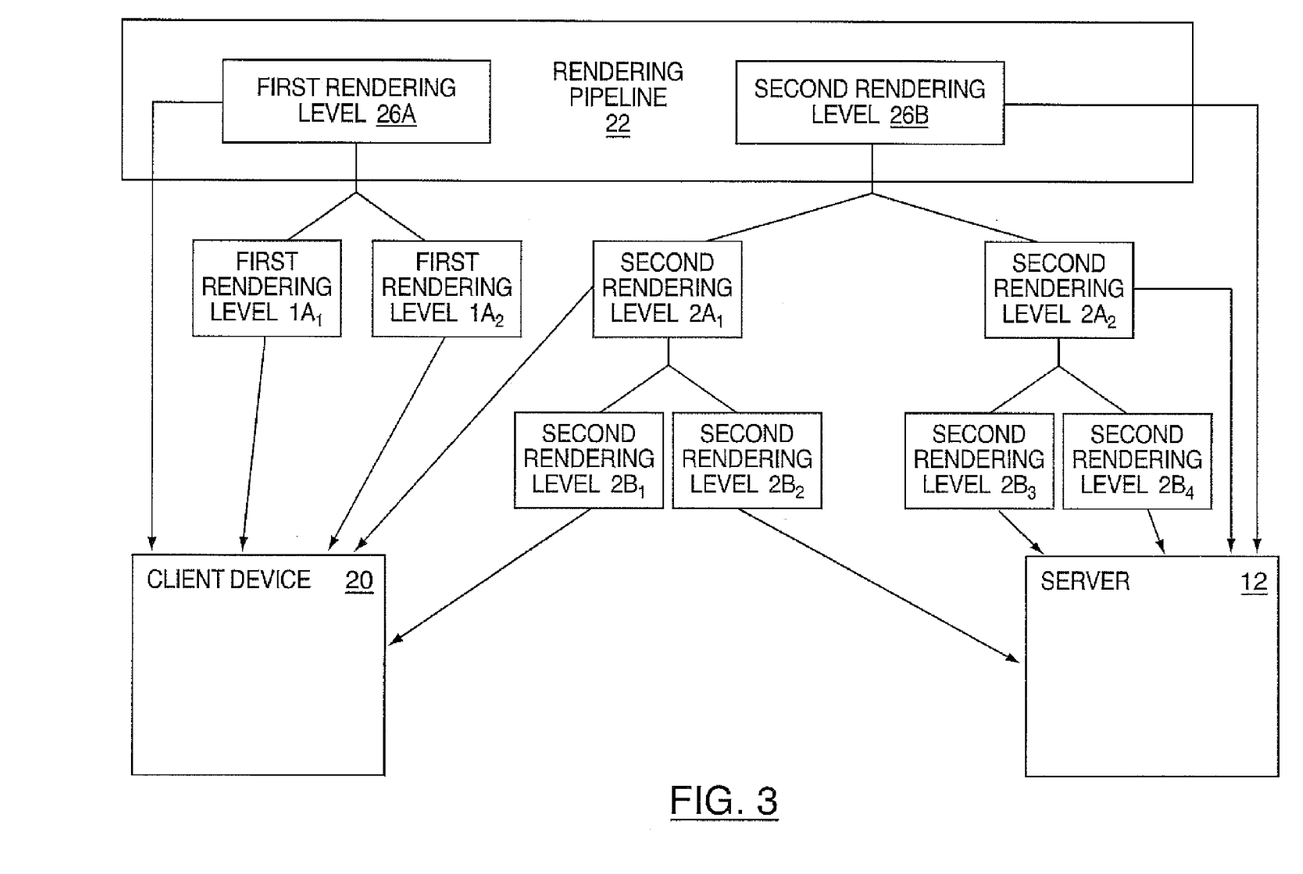
FIG. 3 is a block diagram illustrating the partitioning of image processing functions of the image processing system of FIG. 1.

Reference is now made to FIG. 3, where a block diagram illustrating the concept of the distributed image processing of the image processing system 10 is shown. For exemplary purposes, two rendering levels have been shown for purposes of example in the rendering pipeline 22, the first rendering level 26A and the second rendering level 26B. The first rendering level 26A and the second rendering level 26B are used to refer to the various processing steps that are to be carried out for a requested operation.

Each rendering level, which represents various processing steps, may have associated with it one or more sub rendering levels. A rendering level 26 may be referred to as a parent, and the sub rendering levels for purposes of example may be considered to be children. The sub rendering levels may represent one or more processing steps that are to be performed.

The first rendering level 26A shown in FIG. 3 is shown with two sub rendering levels, the first rendering level $1A_1$ and the second rendering level $1A_2$. Either of the processes associated with the sub rendering levels associated with the first rendering level 26A in this example, may be carried out at the server side 12 or at the client devices 20.

Each sub rendering level may itself have multiple children (sub-rendering levels). Referring to the second rendering level 26B, the second rendering level has associated with it two sub rendering levels, a second rendering level $2A1$ and second rendering level 2A2. The second sub rendering level 2A1, is shown for purposes of example as having two further sub rendering levels itself, second sub rendering level 2B1 and second sub rendering level 2B2. The processing steps of two second sub rendering levels 2B1, and 2B2, respectively may be performed upon an image server 12, and/or the client device 20. Therefore, the various processing steps that are associated with each processing function may be further divided between the server 12 and the client device 20. Similarly, the second rendering level 2A2 is also shown, for purposes of example as having two further sub rendering levels itself, second sub rendering level 2B3 and second sub rendering level 2B4. The processing steps of the two second sub rendering levels 2B3 and 2B4 is shown, for example, to be carried out at the server side 12.

Figure 4:
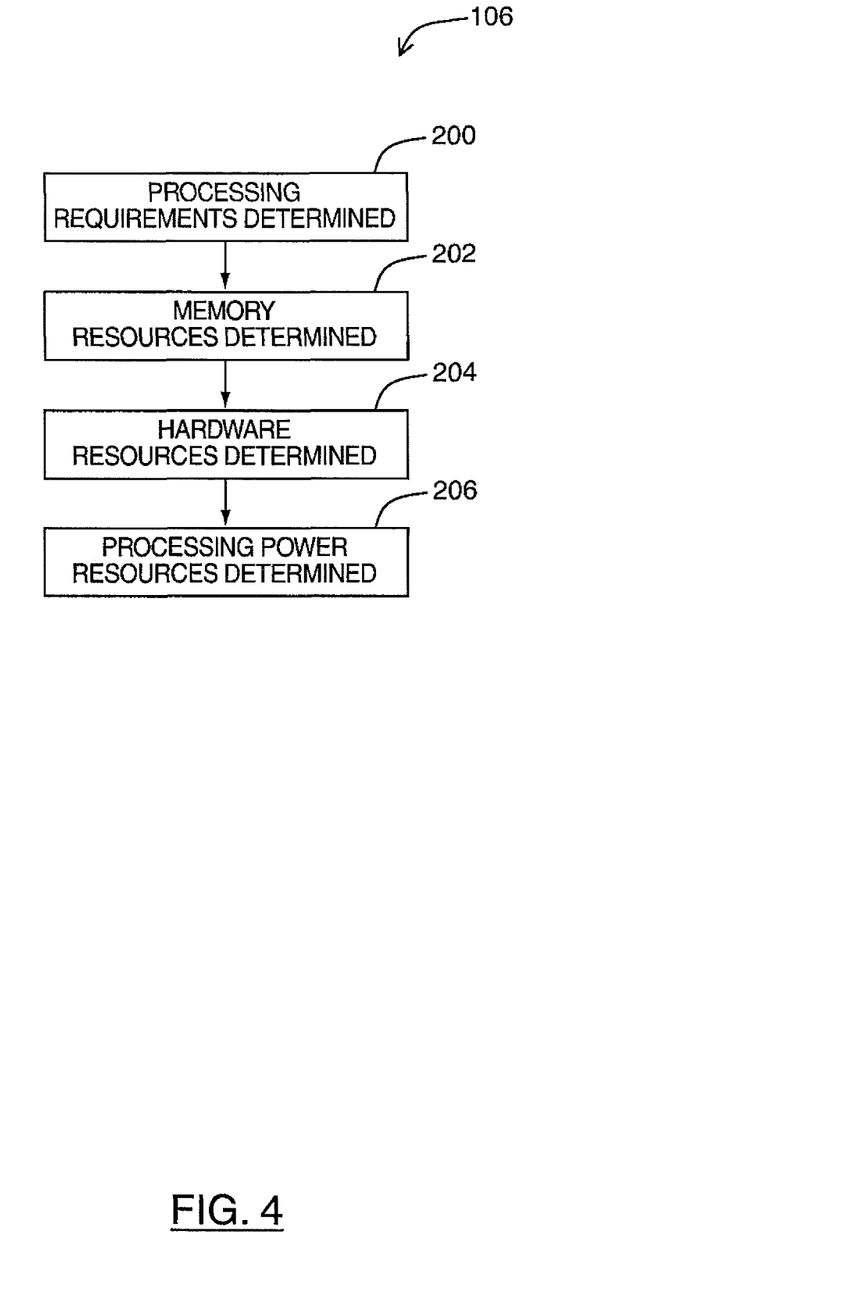
FIG. 4 is a flowchart diagram illustrating in more detail the operational steps executed by the image processing system of FIG. 1.

Reference is now made to FIG. 4 where a flowchart diagram illustrates in more detail the operational steps of the image processing system 10, and in particular, more detail associated with process step (106). The processing, as described herein, is described with respect to the processing that is undertaken at one specific client device 20, and, more specifically, by the rendering module 24 at one specific client device 20. It should be understood that, in the image processing system 10, multiple client devices 20 may interact with multiple servers 12 to determine resource availability when needed.

The steps described herein are described for purposes of example, as the processing requirements that are associated with a requested operation may differ, based on the requested operation. At step (200), based on the requested operation, and the underlying medical image data upon which the requested operation is to be performed, the rendering module 26 first determines which resources, either required or preferred, are used during the execution of the required operation. The determinations, as explained below, are made partly based upon the type and/or size of image data, the available graphics hardware, memory, processing speed, the rendering processes available on the client and other such factors. Based on the various requirements associated with the requested operation, the subsequent steps determine the availability of such resources on the client devices 20 and the one or more servers 12, if needed. The client device 20 determines which rendering levels and their associated rendering steps may be executed upon the client device 20 and the respective image server 12. For example, the client device 20 may have resident upon it various types of renderers (i.e. open GL). However, for purposes of example, a requested operation is shown where three processing requirements are associated with the requested operation (hardware, memory, and processing power).

A determination is made for each rendering level that is part of a rendering pipeline 22. The data that is input to the next rendering level is used to determine which resources are required as the various processing steps that are to be performed on the data are known at this point. The operational steps described herein are provided for purposes of example, as the various processing requirements associated with each requested operation may vary according to the rendering levels associated with such a requested operation and the data upon which the requested operation is based.

Figure 5:
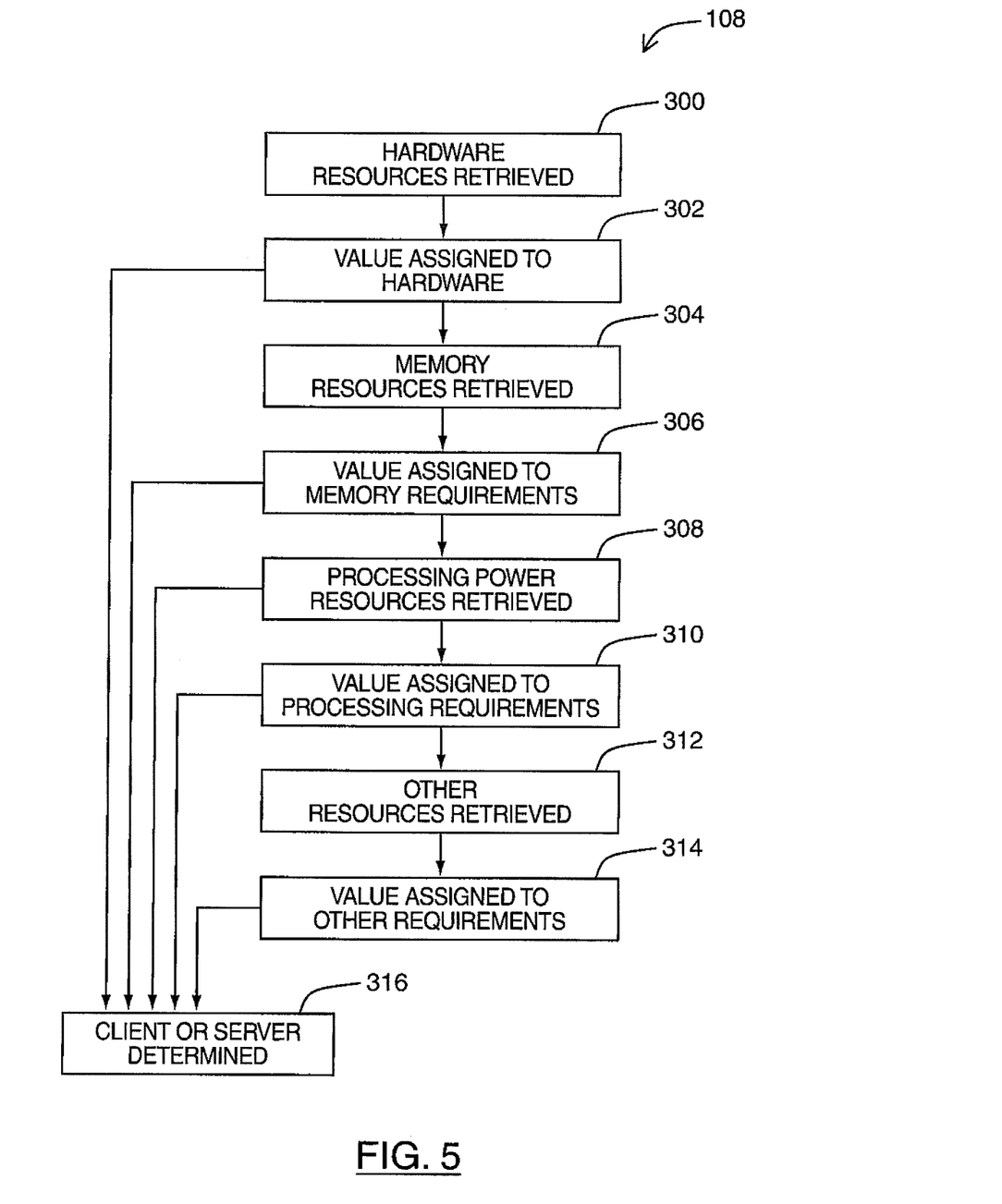
FIG. 5 is a flowchart diagram illustrating in more detail the operational steps associated with the collaboration function of the image processing system of FIG. 1.

Generally, three processing requirements are associated with most requested operations and the availability of such resources are determined for most requested operations when rendering an image. Therefore, the steps, as shown in FIG. 4, and FIG. 5, are described with respect to the determination of the memory, processing power and specialized hardware requirements. At step (202), the memory resources that are available are determined. Specifically, the amount of physical memory that is available on the client device 20 is determined. The memory resources are important as often the image file will need to be stored upon memory and the memory resources that are available on a client device 20 (for example, a PDA) may be limited.

At step (204), the hardware resources are determined. In order to successfully execute a requested operation, the requested operation may have associated with it one or more rendering levels that require particular hardware resources. For example, some rendering steps may require specialized hardware such as graphics processor cards, or cell processors or other such hardware requirements. "Graphics processor cards" is the term used herein to refer to a graphics processor that is associated with a graphics adaptor. Cell processors allow for parallelization on a large scale.

At step (206), the processing power resources are determined. The number of processors and the speeds of such processors that are available are determined. For example, the processing power available on client device 20, such as a PDA, is limited, as compared to the processing power that is associated with one or more servers 12. Also, some rendering steps may be more efficiently implemented if the processing functions may be further distributed or parallelized upon virtual or real CPUs. Therefore, in an exemplary embodiment, the existence of any multiple core processors is determined at this stage.

Steps (200) to (206) have been described with respect to one example, as most rendering steps require certain memory, processing power, and hardware requirements. However, it will be understood that rendering steps or algorithms may have associated with them additional requirements and that the system 10 described herein determines the availability of any resources that are associated with a specific rendering level. Also, it will be understood that certain rendering steps will not have requirements associated with one or more of the memory capabilities, processing power and hardware resources of a client device 20 or image server 12 and, therefore, in such situations, the existence of such resources is not determined by the system 10. The steps that have been described herein, with respect to the determination of resource availability, may be made in parallel.

Reference is now made to FIG. 5 where a flowchart diagram illustrates in more detail operational step (108). The specific determinations as to whether a specific rendering level or rendering step is to take place upon one or more servers 12 or the client device 20 is described in further detail herein. As mentioned above, the required resources and the preferred resources have been described with regard to hardware requirements, memory requirements and processor requirements for purposes of example. In an exemplary embodiment, a weighting factor is used to determine whether the rendering level is to be carried out upon a server 12 or the client device 20.

As an example, the determination as to where (client device 20 or image server 12) the rendering level is to execute rendering may be made, based on various considerations. One such consideration may be based on a determination as to whether the rendering steps are available on the client device 20. If not, then the steps may be executed remotely (at a server 12). Further, the determination could be made, based on the size of the image (including determining the number of slices in the volume) which will indicate the quantity of memory resources needed to perform the rendering steps. If the client device 20 does not have the required memory, a remote server 12 could be used. Further, the determination as to whether remote rendering is used could be based on other factors such as the capabilities of graphics hardware, memory, GPU speed and support of rendering features. Also, the determination could be based on the available network bandwidth. The respective considerations mentioned herein may be analyzed independently or in combination.

It should be understood that the example discussed in association with the following operational steps is provided for exemplary descriptive purposes only. It should be noted that, as discussed, various factors (i.e., network bandwidth, availability of rendering levels, hardware requirements, memory requirements and other factors) are used in the determination of whether the rendering level will execute upon the client device 20 or at a server 12. Information regarding the requirements in an exemplary embodiment is provided by the rendering level. Also, where the respective rendering levels may share a common resource (i.e. memory), the image processing system 10 centrally monitors the availability of the respective resources. The system 10, when one or more rendering levels requires access to a shared resource, may determine and allocate the resources in an optimal manner.

At step (300), the rendering module 26 retrieves the various resource requirements. It should be noted that the operations steps described herein, are described for purposes of example, and, as has been mentioned above, various factors may be taken into consideration when determining whether a rendering level is to take place at the client device 20 or at image server 12.

At step (300), the hardware requirements are retrieved. As mentioned above, the hardware requirements may include, the requirement or preference for dual core processing or specialized hardware, such as graphic adaptor cards or cell processors or any other such specialized hardware requirement.

At step (302), based on the determinations made in steps (200) to (208), the hardware resource availability is retrieved. The hardware resource availability has been determined by the rendering module, as has been described above. In an exemplary embodiment, a weighting system is employed to aid in the determination as to whether a rendering level should be executed.

Three weighting factors may be used for each processing requirement, in an exemplary embodiment. A weighting factor of 1 indicates that the rendering level requires the processing resource. For example, if the client device is found to have quad processors and the algorithm underlying the rendering level requires quad processors, a weighting factor of 1 is assigned to the hardware resource requirements.

A weighting factor of 0.5 indicates that the resource is not a requirement and the algorithm is able to execute without the particular hardware resource (i.e. it is preferred to have a processor of a certain speed but the algorithm will still execute if the processor is not of that speed).

A weighting factor of 0, indicates that the algorithm is not able to execute with the particular resource (i.e., for example, only 4 MB of memory is available on the client device 20 whereas 10 MB is required in order to implement the algorithm).

Also, in an alternative embodiment, depending on the processing requirements, a complex decision tree algorithm may be used when determining where a rendering level will execute. As an example, if the client device 20 has a low bandwidth connection and amount of pixel data is large and does not reside on the client device 20, the respective rendering level may execute upon the server 12. However, if the same data is stored locally, then the rendering steps may execute at the client device 20. As stated above, the operational steps described herein have been described with respect to the use of weighting factors.

At step (302), depending on the hardware requirements and the hardware resources that have been determined in steps (200) to (208), a weighting value is assigned.

At step (304), the memory requirements are retrieved and at step (306) a weighting value is assigned, based on comparison of the memory resources with the memory requirements. At step (308), the processing power requirements are retrieved and at step (310) the processing power resources information is retrieved and the appropriate value is assigned. At step (312), any other processing resources are retrieved and at step (314) a weighting value is assigned to them.

At step (316), the determination is made as to where the respective step/level is to execute. Where a weighting factor has been used, if any weighting values of 0 have been assigned, then one or more servers are queried to determine whether the appropriate processing resources that are required, as determined by the requirements, are available at the image server 12. If the resources are available upon the one or more servers 12, then the rendering step/level will be executed upon the server 12.

Based on the determinations as to where (client or server) the respective rendering process is to take place, the rendering processes are then executed, based on the respective determinations. Upon the conclusion of the rendering process, the output data is provided to the next rendering process through the adaptors of the rendering module. The rendering processes are executed until all of the rendering functions associated with a requested operation are executed and an image is rendered.

While the various exemplary embodiments of the image processing system 10 have been described in the context of medical image management in order to provide an application-specific illustration, it should be understood that the image processing system 10 could also be adapted to any other type of image or document display system.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of processing an image wherein two or more processing functions are executed, the method comprising:
    determining a plurality of steps involved in the two or more processing functions wherein each of the two or more processing functions may comprise one or more processing steps and wherein executing the two or more processing functions to process the image generates a resultant image;
    determining one or more resource requirements associated with each of the two or more processing functions;
    determining a resource availability upon a client device for each of the one or more resource requirements, the client device comprising means for displaying the resultant image and means for a user to engage with the displayed resultant image;
    assigning a weighting factor to each of the resource requirements based on the resource availability upon the client device for each of the one or more resource requirements, the weighting factor identifying one of:

the processing function associated with the resource requirement cannot be performed with the determined resource availability for the resource requirement, the processing function associated with the resource requirement can be performed with the determined resource availability for the resource requirement, or the processing function associated with the resource requirement can optionally be performed with the determined resource availability for the resource requirement; and during processing of the image, a processor dynamically selectively allocating each of the two or more processing functions to the client device and a server depending on the determined resource availability and the weighting factor for any of the one or more resource requirements;

wherein if the weighting factor for any of the one or more resource requirements associated with one of the one or more processing functions identifies that the processing function cannot be performed with the determined resource availability for the resource requirement, then the processing function is allocated to the server; and wherein if any two of the two or more processing functions are executed first on the client device and second on the server, the client device is operable to pass output data generated by the processing function executed on the client device to the processing function executed on the server.

2. The method of claim 1 wherein the two or more processing functions are executed sequentially to process the image.

3. The method of claim 1 wherein the one or more resource requirements are determined based on data associated with the image.

4. The method of claim 1 wherein the one or more resource requirements may be selected from a group comprising: hardware requirements, memory requirements, processor requirements, network requirements and available renderers.

5. The method of claim 1, wherein the one or more resource requirements comprise specialized hardware requirements, wherein the specialized hardware requirements may be selected from a group comprising: graphics processor and cell processor.

6. A non-transitory computer-readable medium upon which a plurality of instructions executable by a processor are stored, the instructions for performing the steps of:

determining a plurality of steps involved in two or more processing functions for processing an image wherein each of the two or more processing functions may comprise one or more processing steps and wherein executing the two or more processing functions to process the image generates a resultant image;

determining one or more resource requirements associated with each of the two or more processing functions;

determining a resource availability upon a client device for each of the one or more resource requirements, the client device comprising means for displaying the resultant image and means for a user to engage with the displayed resultant image;

assigning a weighting factor to each of the resource requirements based on the resource availability upon the client device for each of the one or more resource requirements, the weighting factor identifying one of: the processing function associated with the resource requirement cannot be performed with the determined resource availability for the resource requirement, the processing function associated with the resource requirement can be performed with the determined resource availability for the resource requirement, or the processing function associated with the resource requirement can optionally be performed with the determined resource availability for the resource requirement; and during processing of the image, dynamically selectively allocating each of the two or more processing functions to the client device and a server depending on the determined resource availability and the weighting factor for any of the one or more resource requirements;

wherein if the weighting factor for any of the one or more resource requirements associated with one of the one or more processing functions identifies that the processing function cannot be performed with the determined resource availability for the resource requirement, then the processing function is allocated to the server; and wherein if any two of the two or more processing functions are executed first on the client device and second on the server, the client device is operable to pass output data generated by the processing function executed on the client device to the processing function executed on the server.

7. The non-transitory computer-readable medium of claim 6, wherein the one or more resource requirements comprise specialized hardware requirements, wherein the specialized hardware requirements may be selected from a group comprising: graphics processor and cell processor.

8. A system for processing an image, wherein two or more processing functions are executed, the system comprising:

a memory for storing a plurality of instructions; and a processor coupled to the memory, said processor configured for:

determining a plurality of steps involved in the two or more processing functions wherein each of the two or more processing functions may comprise one or more processing steps and wherein executing the two or more processing functions to process the image generates a resultant image;

determining one or more resource requirements associated with each of the two or more processing functions;

determining a resource availability upon a client device for each of the one or more resource requirements, the client device comprising means for displaying the resultant image and means for a user to engage with the displayed resultant image;

assigning a weighting factor to each of the resource requirements based on the resource availability upon the client device for each of the one or more resource requirements, the weighting factor identifying one of: the processing function associated with the resource requirement cannot be performed with the determined resource availability for the resource requirement, the processing function associated with the resource requirement can be performed with the determined resource availability for the resource requirement, or the processing function associated with the resource requirement can optionally be performed with the determined resource availability for the resource requirement; and during processing of the image, dynamically selectively allocating each of the two or more processing functions to the client device and a server depending on the determined resource availability and the weighting factor for any of the one or more resource requirements;

wherein if the weighting factor for any of the one or more resource requirements associated with one of the one or more processing functions identifies that the processing function cannot be performed with the determined resource availability for the resource requirement, then the processing function is allocated to the server; and wherein if any two of the two or more processing functions are executed first on the client device and second on the server, the client device is operable to pass output data generated by the processing function executed on the client device to the processing function executed on the server.

9. The system of claim 8 wherein the two or more processing functions are executed sequentially to process the image.

10. The system of claim 8 wherein the one or more resource requirements are determined based on data associated with the image.

11. The system of claim 8 wherein the one or more resource requirements, may be selected from a group comprising: hardware requirements, memory requirements, processor requirements, network requirements and available renderers.

12. The system of claim 8, wherein the one or more resource requirements comprise specialized hardware requirements, wherein the specialized hardware requirements may be selected from a group comprising: graphics processor and cell processor.

* * * * *